B. D. STEVENSON.
LEVER CONTROLLING DEVICE FOR PLANETARY GEAR AUTOMOBILES.
APPLICATION FILED AUG. 29, 1917.

1,249,688.

Patented Dec. 11, 1917.

Witnesses:

Inventor:
Barton D. Stevenson,

UNITED STATES PATENT OFFICE.

BARTON D. STEVENSON, OF HARVARD, ILLINOIS.

LEVER-CONTROLLING DEVICE FOR PLANETARY-GEAR AUTOMOBILES.

1,249,688.

Specification of Letters Patent. Patented Dec. 11, 1917.

Application filed August 29, 1917. Serial No. 188,745.

*To all whom it may concern:*

Be it known that I, BARTON D. STEVENSON, a citizen of the United States, residing at Harvard, in the county of McHenry and State of Illinois, have invented a new and useful Improvement in Lever-Controlling Devices for Planetary-Gear Automobiles, of which the following is a specification.

My invention relates to certain new and useful improvements in lever-controlling devices for planetary gear automobiles and is fully described and explained in the specification and shown in the accompanying drawings, in which—

Figure 1:
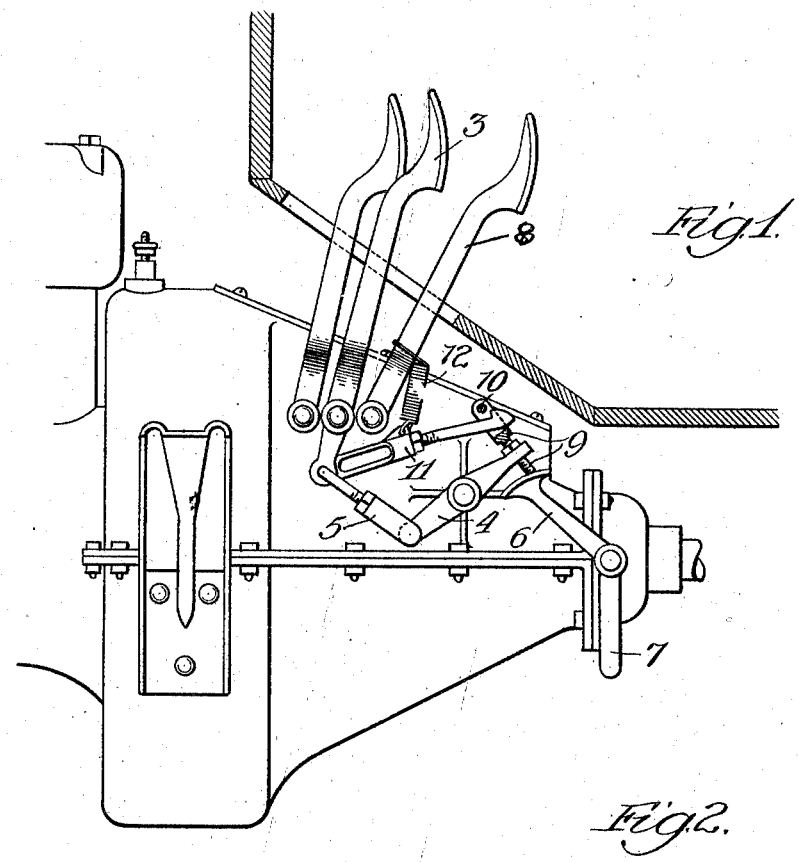
Figure 2:
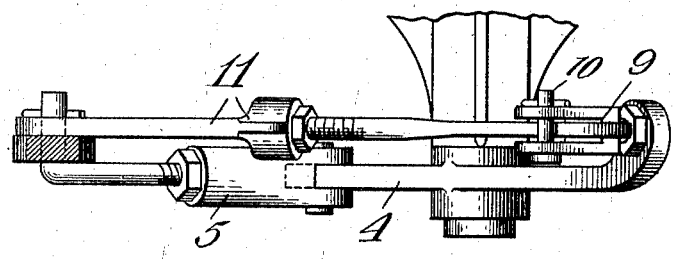

Figure 1 is a side elevation showing my device attached to the transmission of a Ford car and Fig. 2 is a plan of my device and certain adjacent parts.

Referring to the drawings, 3 is the clutch pedal, 4 the clutch lever, 5 the slow-speed connection and clevis, and 6 is the cam carried by the controller shaft 7 of known form. The arrangement is such that when the pedal 3 is pushed forward the low speed gears come into action, when it is in mid position the gears are in neutral and when released the clutch engages for direct driving. The parts may be held in neutral by the cam 6 controlled by the emergency brake lever (not shown). 8 is the reverse pedal.

In installing my device the clutch lever screw is removed and replaced by a longer screw 9, the upper end of which is bifurcated, the furcations being connected by a pin 10. 11 is a hook of adjustable length, pivoted to the forward end of the slow-speed connection. This connection may conveniently be made by replacing the stock slow-speed connection with one having a longer bent forward end, whereupon the perforate end of the hook 11 may be slipped into place and held with a cotter pin. The rear end of the hook lies between the furcations of the screw 9 and, when the gears are in neutral, the hooked end lies just to the rear of the pin 10. A spring 12 connects the hook with the reverse pedal, its length being such that when the pedal is in normal or rear positions there is no tension on the spring, but, on the contrary, the turns of the spring are in close contact so that the rear end of the hook is pressed quite definitely, but lightly down.

The operation is as follows: Starting with the gears held in neutral, either by the foot or by the controller shaft, the reverse pedal is pressed forward enough to raise the rear end of the hook so as to be in position to engage the pin 10. The clutch pedal is then set free (either by removing the foot from the pedal or moving the controller shaft, as the case may be) and the tendency is then to swing the front end of the hook 11 forward and the screw 9 back slightly. Such movement is prevented by the engagement of the hook with the pin 10, which engagement is maintained by the tension operating on the clutch pedal to return it to normal or rear position. All pedals may then be released and the gears will stay in neutral, or the car may be backed at will without danger of having either the clutch or slow-speed band in partial engagement. However, the reverse pedal being released and the clutch pedal moved forward for slow speed, the hook will immediately be released from the pin and the car may be run forward in low gear. After this, if the reverse pedal be not again pressed, the clutch pedal may be released without interference by the hook, for the rear end of the hook lies in the bottom of the slot in the pin 9, except when raised by the reverse lever or held up after such rising movement. On the other hand, if several movements, first forward and then back, must be performed as in turning, the hook will engage and prevent the clutch from going in, providing only that the reverse pedal be pushed forward slightly before or as the clutch pedal moves back to neutral position.

Thus the attachment interlocks the reverse and clutch pedals so that when the reverse pedal is in action in the normal way the gears are held accurately in neutral, and yet no normal or proper action of the pedals is remotely interfered with. It not only prevents dragging of the clutch or slow-speed band in reversing with the emergency brake lever pushed down, but, under like conditions, frees one foot so that the reverse pedal and foot brake can be operated in rapid succession without shifting the foot from one pedal to the other as is usually required.

I realize that considerable variation is possible in the details of the construction herein shown, and I do not intend to limit myself thereto, except as pointed out in the following claims, in which it is my intention to claim all the novelty inherent in the device as broadly as is permitted by the state of the prior art.

I claim:

1. The combination with a planetary transmission having a clutch pedal which in forward position sets the slow speed band and in rear position sets the clutch, and a reverse pedal, of means set by the reverse pedal and released by movement of the clutch pedal to slow speed position for locking the clutch pedal against movement to high speed position.

2. The combination with a planetary transmission having a clutch pedal which in forward position sets the slow speed band and in rear position sets the clutch and a reverse pedal, of a hook device carried by the clutch pedal and connected with the reverse pedal and arranged, as the reverse pedal is moved, to lock the clutch pedal against movement to high speed position and to be released by the movement of the clutch pedal to low speed position.

3. The combination with a planetary transmission having a clutch pedal which in forward position sets the slow speed band, a clutch lever link connected with the clutch pedal to permit the clutch to engage upon rear movement of the clutch pedal, a reverse pedal, of a locking device pivoted to the clutch pedal and connected to the reverse pedal to be operated upon the movement thereof to engage with the clutch lever to prevent the movement of the clutch pedal to high speed position, and adapted to release upon movement of the clutch pedal to slow speed position.

4. The herein described attachment comprising a slotted bolt adapted to replace the clutch lever adjusting screw, a hook adapted to be pivoted to the clutch pedal at its lower end and to lie within the slot of said bolt and a spring connectible with the reverse pedal to raise the hook into engaging position upon the operation of the reverse pedal.

In testimony whereof I have hereunto set my hand this 9th day of August, 1917.

BARTON D. STEVENSON.